Nov. 18, 1924.
A. P. KNILL
1,515,955
TRANSMISSION
Filed July 13, 1923   3 Sheets-Sheet 1
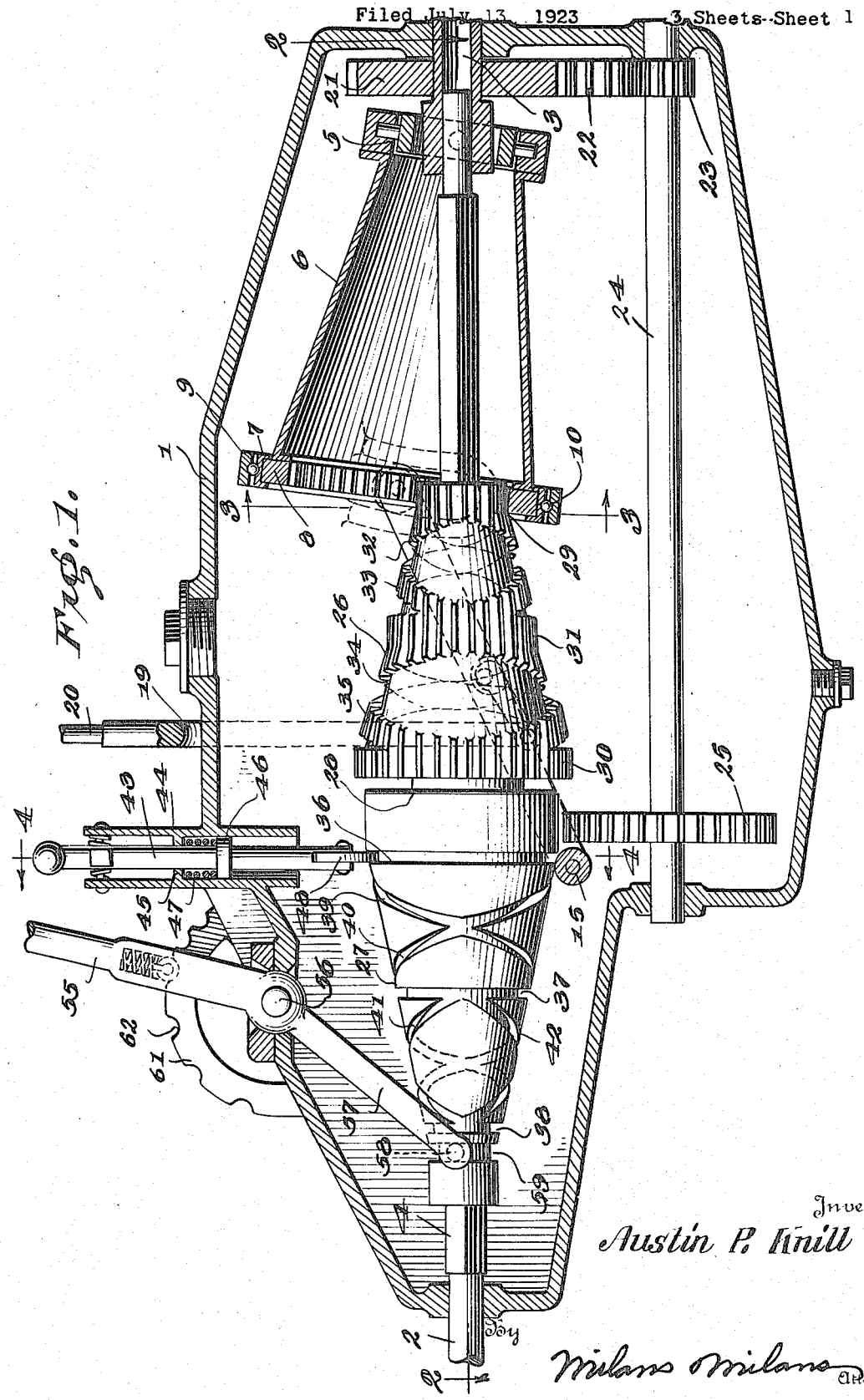
Inventor
Austin P. Knill
By
Milano Milano
Attorney

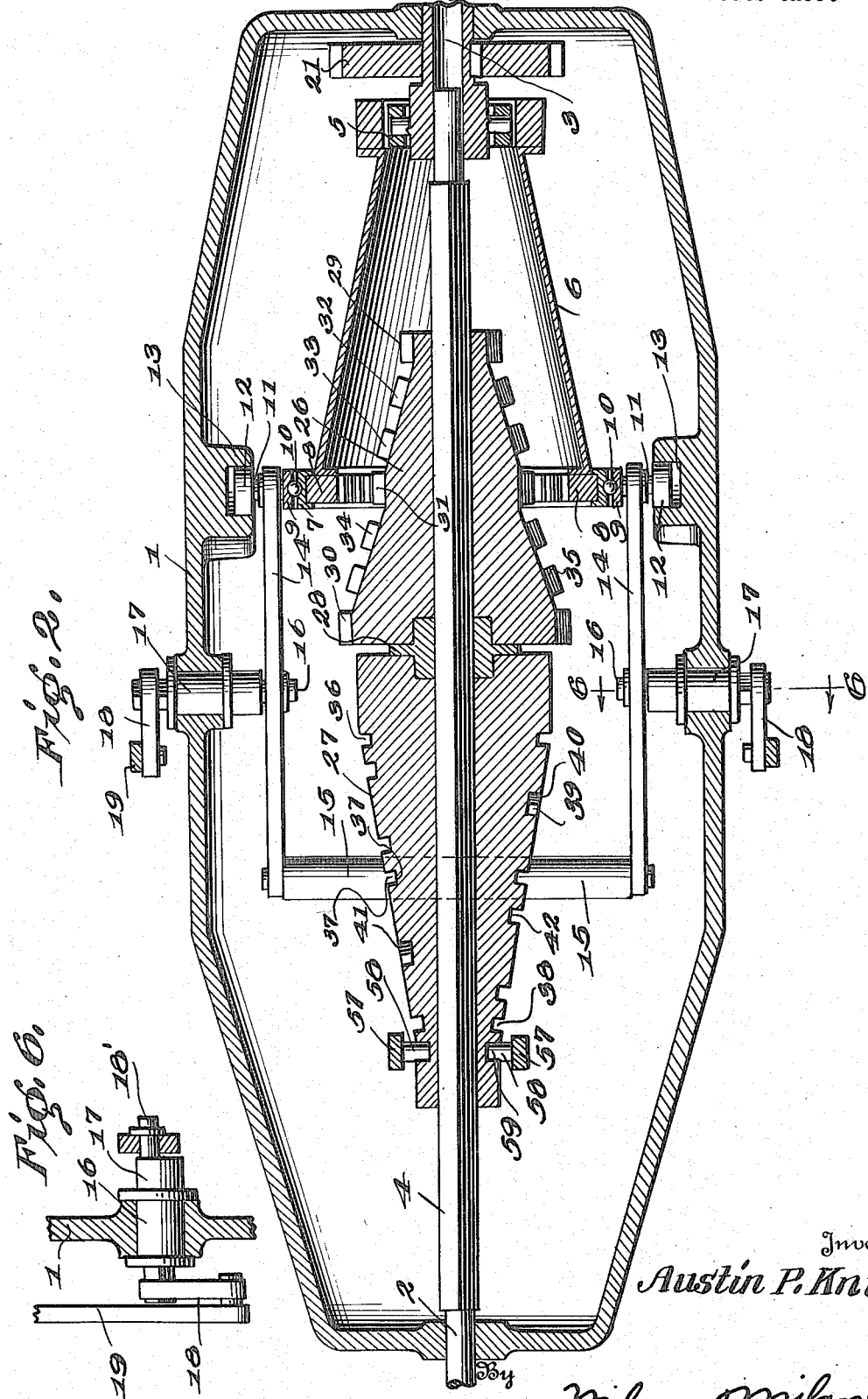

Nov. 18, 1924.  
A. P. KNILL  
1,515,955  
TRANSMISSION  
Filed July 13, 1923  
3 Sheets-Sheet 3
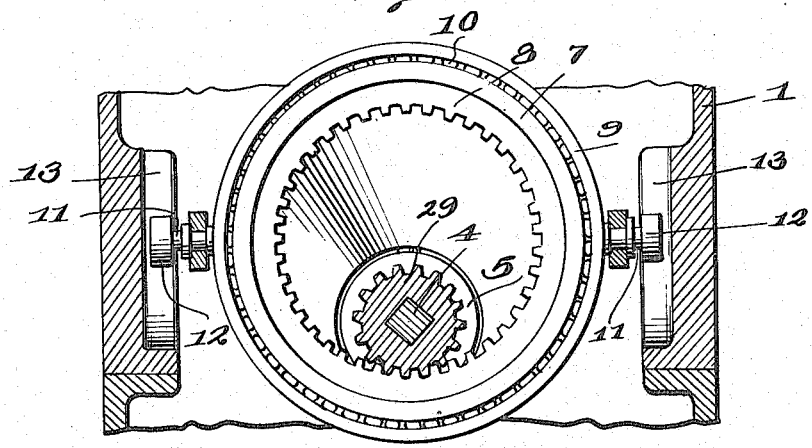
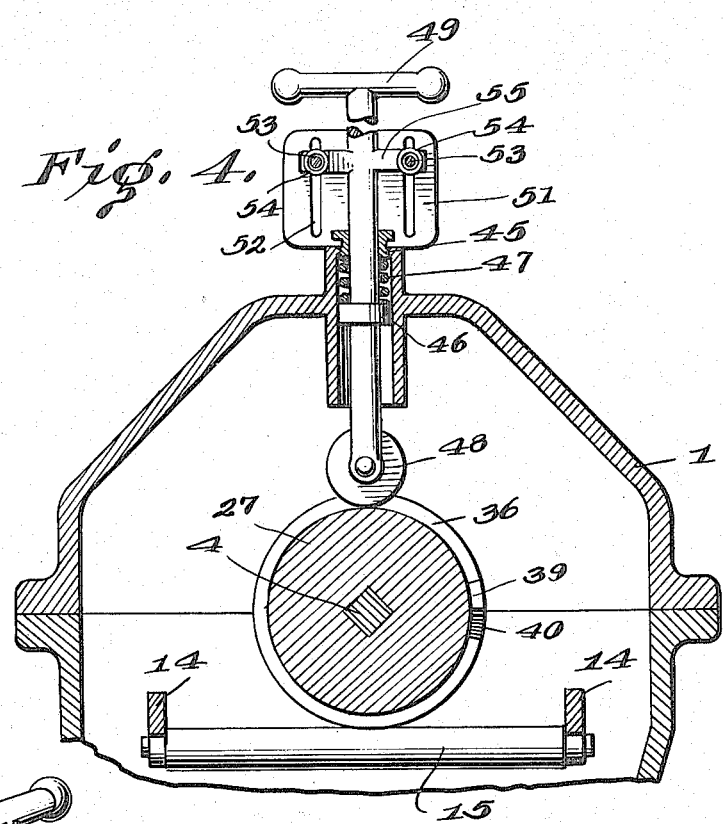
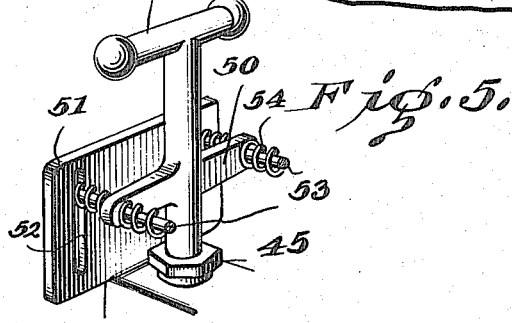
Inventor  
Austin P. Knill  
By Milans & Milans  
Attorney Patented Nov. 18, 1924.

1,515,955

UNITED STATES PATENT OFFICE.

AUSTIN P. KNILL, OF WOODBINE, MARYLAND.

TRANSMISSION.

Application filed July 13, 1923. Serial No. 651,339.

*To all whom it may concern:*

Be it known that I, AUSTIN P. KNILL, a citizen of the United States, residing at Woodbine, in the county of Carroll and State of Maryland, have invented certain new and useful Improvements in Transmissions, of which the following is a specification, reference being had therein to the accompanying drawing.

My invention relates to new and useful improvements in a variable speed transmission which is primarily intended for use upon motor vehicles although I wish it distinctly understood that such transmission could readily be used for other purposes where it may be desired to vary speed.

The primary object of the invention resides in the construction of the transmission in such a manner that the gears may be shifted from one speed to another without clashing the gears, a continuous operation being possible during the said shifting of the gears either from low to second, from second to high or from high to second, and second to low.

Another object consists in the provision of an internal gear which is carried by a pivoted frame or support which is adapted to be shifted during the changing from one speed to another so that the gear may properly mesh with gears of different diameter which are shifted to change the speeds, the gears of different diameter being formed on or secured to a tapered member which is provided intermediate the gears of different diameter with spirally arranged teeth, which I may term bridge teeth, which allow the tapered member to be moved relative to the internal gear without taking the internal gear from out of mesh with the tapered member, or in other words as the tapered member is shifted to change the speed the internal gear will mesh with the bridge teeth and be properly guided into or meshed with the speed gears on the tapered member.

A further object resides in the provision of a shiftable rod or lever which is adapted to be engaged with a tapered or conical shaped member for automatically shifting the gears of different diameter in either direction so as to bring said different diametered gears into mesh with the internal gear.

Still another object consists in the provision of means whereby the gears may be shifted manually in either direction, when shifted in one direction the gears of the tapered member being brought into mesh with the internal gear and when shifted in the opposite direction one gear, the high speed gear of the tapered member, being brought into mesh with a reversed gear.

A still further object resides in the provision of means for manually swinging the frame or support which carries the internal gear so that the gears on the tapered member may be slid manually, when desired, without engaging the internal gear with the bridge teeth, or the teeth between the gears of different diameters.

With the above and other objects in view, which will appear as the description proceeds, my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a longitudinal vertical section with parts shown in elevation.

Fig. 2 is a horizontal section on the line 2—2 of Fig. 1 looking in the direction of the arrows.

Fig. 3 is a transverse vertical section on the line 3—3 of Fig. 1, looking in the direction of the arrows.

Fig. 4 is a transverse vertical section on the line 4—4 of Fig. 1, looking in the direction of the arrows.

Fig. 5 is a detail perspective of the operating lever used for automatically shifting gears, and Fig. 6 is a detail showing the bushing used in supporting the lever which swings the internal gear.

In the drawings 1 indicates the transmission housing, 2 the drive shaft and 3 the driven shaft, the shafts 2 and 3 being rotatably supported in the ends of the housing 1 as more particularly illustrated in Figs. 1 and 2. The ends of the drive shaft 2 are round whereas the intermediate portion is squared as shown at 4, the inner rounded end of the shaft 2 being rotatably supported in the inner end of the shaft 3, which is hollow so that, until the gears to be later described are in mesh, the drive shaft 2 may rotate without imparting movement to the driven shaft 3.

Secured to the inner end of the driven shaft 3, by means of the universal joint 5, is the conical shaped hollow supporting member 6, the inner end of which is slightly enlarged as shown at 7 and supports the internal gear 8 as is more clearly illustrated in Fig. 1. Surrounding the enlarged end 7 is a ring or band 9 which is of slightly greater diameter than the enlarged end 7 so as to provide a space to receive the ball bearings 10. Formed on the outer face of the ring or band 9, on opposite sides thereof, are the studs 11 which have the rollers 12 mounted thereon, said rollers being received and operating in guides 13 formed on the sides of the inner faces of the housing 1 as more particularly shown in Figs. 1 and 3. The rollers operating in the guides properly position the support 6 when the same is raised and lowered in a manner to be later described. As shown, more particularly in Fig. 1 of the drawings, the guides 13 are slightly arcuate shaped so as to accommodate the swing of the support.

Pivotally connected to each of the studs 11 is a bar 14, the opposite ends of the bar being connected by a roller 15 as shown more clearly in Figs. 2 and 4 of the drawings. Supported in each side of the housing 1 is a bushing 16 through which extends a shaft 17. An arm 18 is connected to the outer end of each shaft and an eccentrically arranged pin 18' is formed on the opposite end of the shaft and extends through the bar 14. Each of the arms 18 is connected to the vertical arms 19 of a handle or lever 20, the arms 19 straddling the housing 1 as more particularly illustrated in Figs. 1 and 2 of the drawings. As the handle or lever 20 is raised or lowered it will, through means of the arms 18, rotate the shaft 17 and through the eccentrically arranged pins 18' raise or lower the bars 14 and the free end of the support 6 which carries the internal gear.

Keyed upon the driven shaft 3 is a gear wheel 21 which meshes with an idler gear 22 which in turn meshes with a gear 23 keyed to the horizontally extending shaft 24 which is rotatably supported in the housing 1 beneath the drive and driven shafts 2 and 3 as more clearly illustrated in Fig. 1 of the drawings. Also keyed to the shaft 24, at the end opposite to that carrying the gear 23 is a gear 25 which is of considerably greater diameter than the gear 23 for a purpose which will be later appreciated. The gears 21, 22, 23, and 25 are used as a reverse in a manner which will be later described.

Slidably mounted upon the squared portion 4 of the drive shaft 2 are the conical or tapered members 26 and 27, said members being arranged upon the shaft so that their larger ends are adjacent one another, as more clearly shown in Figs. 1 and 2 of the drawings and the members are preferably connected by means of a sleeve 28 which spaces the ends of the members and allows them to move in unison when operated in a manner to be later described. The member 26 is provided with the relatively small gear 29, the large gear 30, and the intermediate gear 31, each of said gears adapted to be moved so as to mesh with the internal gear 8, the small gear 29, when meshing with said internal gear 8 acting as low speed, the gear 31 when meshing with the internal gear acting as second or intermediate speed, and the gear 30, when meshing with the internal gear 8 giving high speed. It is a well known fact that, in the usual form of transmission, that very often in shifting the gears there is a clash which either strips the gears or wears the same so that their usefulness is impaired or totally destroyed. In order to overcome this gear clash or stripping I provide between the gear 29 and the gear 31, and the gear 31 and the gear 30 toothed bridge members which during the shifting of the gears will be in mesh with the internal gear 8 and feed said internal gear from one gear to the other without clashing of the gears. Between the gear 29 and the gear 31 there are the two spiral bridge gears 32 and 33 and between the gears 31 and 30 there are the bridge gears 34 and 35 the bridge gear 33 being used to feed from the gear 29 to the gear 31 and the gear 32 being used to feed from the gear 31 to the gear 29. The bridge gear 35 is used to feed from the gear 31 to the gear 30 and the bridge gear 34 is used to feed from the gear 30 to the gear 31 it being understood that the drive shaft will operate in one direction at all times. In other words as the conical member 26 is fed towards the internal gear 8 the bridge gear 33 will mesh with the internal gear 8 so as to feed from the gear 29 to the gear 31 and the bridge gear 35 will mesh with the internal gear to feed from the gear 31 to the gear 30. When the conical member 26 is fed in the opposite direction the bridge gear 34 will feed from the gear 30 to the gear 31 and the bridge gear 32 will feed from the gear 31 to the gear 29. It will thus be seen that during the feeding action the internal gear 8 will be constantly in mesh either with the gears 29, 31 and 30 or the bridge gears 32, 33, 34 and 35 and there will be no chance whatever of the gears clashing for there is a continuous meshing of the gears.

It can readily be appreciated that as the conical member 26 is moved to shift the gears 29, 31 and 30 into mesh with the internal gear 8 that it is necessary to raise or lower the said internal gear 8 so that it will accommodate for the different diameters of the gears 29, 31 and 30. The conical member 27 is used for sliding the conical member 26 and also for raising and lowering the support 6 and the internal gear 8, said conical member 27 resting upon the roller 15, carried by the arms 14 as more clearly illustrated in Figs. 1, 2 and 4 of the drawings. The conical member 27 is provided, adjacent its enlarged end, with a circumferentially extending groove 36, intermediate its ends, with a circumferentially extending groove 37, and adjacent its smaller end with a circumferentially extending groove 38. Connecting the grooves 36 and 37 are the spiral grooves 39 and 40 and connecting the grooves 37 and 38 are the spiral grooves 41 and 42. Cooperating with the conical member 27 for sliding the same, is a lever or rod carried by the transmission housing and provided with a roller which is adapted to be engaged in the various grooves of the conical member. The lever or rod comprises the vertically extending portion 43 which is both slidably and rotatably supported in the vertically extending guide 44 formed on the upper surface of the housing 1. This guide 44 has the intermediate bridge portion 45 through which the rod 43 passes, the rod 43 being provided with a shoulder 46. A coiled spring 47 surrounds the rod 43 between the shoulder 46 and the bridge 45, thereby normally forcing the rod downwardly. Carried by the lower end of the rod 43 is a roller or disc 48 which is relatively thin so as to be received in the grooves of the member 27 previously described. Formed on the upper end of the rod 43 is a transversely extending handle portion 49 and below said handle portion are the arms 50 which normally operate between the plates 51, forming the upper part of the guide 44, the plates 51 being provided with the vertically extending elongated openings 52 through which extend rods 53 carried by the arms 50. Coiled springs 54 surround the rods 53 on opposite sides of the arms 50, and engage the inner faces of the plates 51 so as to normally hold the rod 43 with the disc or roller 48 extending in a position to be received in one of the circumferentially extending grooves 36, 37 or 38 of the member 27 as more clearly illustrated in Fig. 1 of the drawings. When the small gear 29 is in mesh with the internal gear 8 the disc or roller 48 will be received in the groove 36 and the transmission will be in low gear. When it is desired to go into second gear the handle portion 49 of the operating rod or lever 43 will be grasped and turned, against the action of the springs 54, so that the roller or disc 48 will feed into the spiral groove 39 and then the continued rotation of the drive shaft will feed the conical member 27, and the conical member 26 towards the internal gear, the internal gear thereby engaging the bridge gear 33 and being in mesh therewith until the gear 31 is in mesh therewith. When the gear 31 meshes with the internal gear 8 the transmission is in second gear and the disc or roller 48 will be received in the circumferentially extending groove 37 and held in position therein by means of the springs 54 which have returned the operating rod or lever 43 to its normal or original position. It will be understood that as the conical member 26 is moved, to change the internal gear from mesh with the gear 29 to the gear 31, that due to the increased diameter of the gear 31 it is necessary to lower the support 6 and internal gear 8. As the conical member 27 rides over the roller 15, the diameter of the member 27 decreasing during such feeding action, the end of the support carrying the internal gear will be allowed to drop, through means of the arms 14, so as to be in position to ride over the bridge gears and mesh with the gear 31. When it is desired to change from second to high gear the operating lever or rod 43 is again turned so that the disc or roller 48 will ride in the spiral groove 42 of the member 27 and this will feed the member 27 and the member 26 towards the internal gear thereby allowing the internal gear to mesh with the spiral bridge 35 until the gear 30 is reached and meshes with the internal gear. The support 6 and internal gear 8 will be lowered in the same manner as previously described and when the gear 30 is in mesh with the internal gear the disc or roller 48 will operate in the circumferentially extending groove 38. When it is desired to change from high to second gear the position of the roller or disc 48 is reversed so as to be received in the groove 41 and this will feed the member 27 and member 26 in the opposite direction so that the internal gear will mesh with the bridge 34 until it meshes the intermediate gear 31. When feeding from second to low gear the disc or roller 48 will engage in the spiral groove 40 and allow the internal gear to mesh with the spiral bridge 32 until the low speed or small gear 29 is in mesh with the internal gear 8. The support 6 carrying the internal gear is allowed to raise, to accommodate for the different diameters of the gears 29, 31, and 30 by the increased diameter of the member 27 engaging the roller 15 which in turn operates the bars 14 and raises the free end of the support 6.

At times it may be desirable to shift the gears without allowing the internal gear 8 to mesh with or operate over the bridge gears. This is necessary when the gears are to be moved into neutral or into reversed position. In order that said gears may be shifted, independently of the bridge gears, I provide the lever 55 which is pivotally connected to the transmission housing 1 at 56 and is provided with the forked end 47 carrying the pins 58 which operate in a circumferentially extending groove 59 formed adjacent the groove 38 in the member 27. The lever 55 carries a spring pressed roller 57 which is adapted to operate over the segment 61 which is provided with the longitudinally spaced recesses 62. As the gears are shifted by the lever or rod 43 the lever 55 will be automatically swung and the roller 60 will ride over the segment 61 and be received in one of the recesses 62. The engagement of the roller in the recess will continue to hold the members 27 and 26 in their shifted position. When it is desired to operate the gears without meshing the internal gear 8 with the bridge gears the lever 55 is swung upon its pivot 56 and by this movement the gears may be shifted in either direction. With the gears in the position shown in Fig. 1 the lever 55 may be swung to disengage the gear 29 from the internal gear 8, and when thus disengaged the gears will be in neutral. When it is desired to reverse the lever is again grasped to further move the conical member 26 so as to bring the gear 30 into mesh with the gear 25. By operating the lever 55 in the opposite direction the gear 30 may be disengaged from the gear 25 and the gear shifted again to neutral and a further movement of the lever 55 in this direction will bring the small gear 29 into mesh with the internal gear 8 so as to secure low speed. When it is desired to operate the gears by the lever 55 it can be appreciated that it will be necessary to lower the support 6 and internal gear 8 from the position shown in Fig. 1 and to accomplish this I provide the eccentric pins 18' on the shafts 16 which when the shafts are rotated will lower the free or large end of the support 6 and thereby position the internal gear 8 so that it will not mesh with any of the gears carried by the conical member 26. The shafts are swung by operating the handle or lever 20 which through the vertically extending bars 19 swings the arms 18 and thereby rotates the said shafts. When shifting by the lever 55 it will be necessary to disengage the roller or disc from the grooves of the member 27. This is accomplished by raising the rod or lever 43 against the action of the spring 47, the spring returning the parts to their original positions when released.

From the above detail description it will be seen that I have provided a variable speed transmission in which the gears may be shifted without danger of stripping the gears or without gear clash and the internal gear will ride over the bridge gears and be fed from one gear to another. There is a continuous operation during the transfer from one gear to the other and the teeth of the bridge gears are so positioned that they will feed the internal gear directly into mesh with the changeable speed gears. There are two oppositely directed spiral bridge gears between each of the speed gears so that one may feed from low gear to second gear and from second gear to high gear or from high gear to second gear and then from second gear into low gear. At the same time I provide novel means for throwing the gears into neutral position or into position for reversing. The internal gear is shifted to accommodate for the speed gears of different diameters and this shifting is accomplished automatically during the movement of the gears. The conical member having the grooves acts both for shifting the gears and for operating the mechanism which shifts the internal gear.

Having fully described my invention what I claim as new and desire to secure by Letters Patent is:

1. A device of the character described comprising a driving member, longitudinally spaced gears carried by the driving member, a driven member, a gear carried by the driven member and adapted for swinging movement, means for shifting the driving member to mesh the different gears carried thereby with the gear of the driven member, and means engageable with and operable by the driving member for swinging the gear carried by the driven member.

2. A device of the character described comprising a driving member having longitudinally spaced gears thereon, a driven member, a support connected to the driven member for swinging movement, a gear carried by the support, means for shifting the driving member to bring the different gears thereof into mesh with the gear of the driven member, and means engageable with and operable by the driving member for swinging the support.

3. A device of the character described comprising a conical shaped driving member, longitudinally spaced gears carried by said driving member, said gears being of different diameters, toothed bridges carried by the driving member and extending between the longitudinally spaced gears, a driven member, a gear carried by the driven member, means for shifting the driving member so as to bring the different gears into mesh with the gear of the driven member, the bridges between the gears meshing with the gear of the driven member during the shifting of the driving member, and means operable by the movement of the driving member for moving the gear of the driven member so as to properly position the same to engage the toothed bridges and the different diametered gears.

4. A device of the character described comprising a driving member, longitudinally spaced gears carried by the driving member, a driven member, a gear carried by the driven member and adapted for swinging movement, a tapered enlargement on the driven member, means for shifting the driven member to mesh the different gears carried thereby with the gear of the driven member, and means operable by the tapered enlargement of the driving member for swinging the gear of the driven member.

5. A device of the character described comprising a driving member, longitudinally spaced gears carried by the driving member, a driven member, a gear carried by the driven member and adapted for swinging movement, a tapered enlargement on the driving member, means for shifting the driving member to mesh the different gears carried thereby with the gear of the driven member, and means connected to the swinging gear and operable by engagement with the tapered enlargement of the driving member for swinging the gear of the driven member upon shifting of the driving member.

6. A device of the character described comprising a driving member having longitudinally spaced gears thereon, a driven member, a gear connected to the driven member for swinging movement, a tapered member connected to the driving member, means for shifting the driving member to bring the different gears thereof into mesh with the gear of the driven member, and means operable by the tapered member for swinging the gear of the driven member.

7. A device of the character described comprising a driving member having longitudinally spaced gears thereon, a driven member, a gear connected to the driven member for swinging movement, a tapered member connected to the driving member, means for shifting the driving member to bring the different gears thereof into mesh with the gear of the driven member, and means connected to the gear of the driven member and engageable with the tapered member for swinging the gear of the driven member during the shifting of the driving member.

8. A device of the character described comprising a driving member having longitudinally spaced gears thereon, a driven member, a gear connected to the driven member for swinging movement, a tapered member connected to the driving member, means engageable with the tapered member for shifting the driving member to bring the gears thereof into mesh with the gear of the driven member, and means engageable with the tapered member for swinging the gear of the driven member.

9. A device of the character described comprising a driving member having longitudinally spaced gears thereon, a driven member, a gear carried by the driven member, a tapered member connected to the driving member, and means engageable with the tapered member for shifting the driving member to bring the different gears thereof into mesh with the gear of the driven member.

10. A device of the character described comprising a driving member having longitudinally spaced gears thereon, a driven member, a gear carried by the driven member, a tapered member connected to the driving member and provided with spirally arranged grooves, and means engageable in said spirally arranged grooves for shifting the driving member to bring the different gears thereof into mesh with the gear of the driven member.

11. A device of the character described comprising a driving member having longitudinally spaced gears thereon, a driven member, a support connected to the driven member for swinging movement, a gear carried by the support, a tapered member connected to the driving member and having spirally arranged grooves therein, means engageable in the spirally arranged grooves for shifting the driving member to bring the different gears thereof into mesh with the gear carried by the support, and means engageable with the tapered member for swinging the support.

12. A device of the character described comprising a driving member having longitudinally spaced gears thereon, a driven member, a gear connected to the driven member, means operable by the rotation of the driving member for shifting the driving member to bring the gears thereof into mesh with the gear of the driven member, and means independent of the rotation of the driving member for shifting the same.

13. A device of the character described comprising a driving member having longitudinally spaced gears thereon, a driven member, a gear connected to the driven member for swinging movement, means operable by the rotation of the driving member for shifting the driving member to bring the different gears thereof into mesh with the gear of the driven member, means operable by the shifting of the driving member to swing the gear of the driven member, and means independent of the shifting of the driving member for swinging the gear of the driven member.

14. A device of the character described comprising a driving member having longitudinally spaced gears thereon, a driven member, a gear carried by the driven member for swinging movement, means operable by the rotation of the driving member for shifting the driving member to bring the different gears thereof into mesh with the gear of the driven member, means independent of the rotation of the driving member for shifting the same, means operable by the shifting of the driving member for swinging the gear of the driven member, and means independent of the shifting of the driving member for swinging the gear of the driven member.

15. A device of the character described comprising a driving member having longitudinally spaced gears thereon, toothed bridges formed on the driving member for connecting the gears, a driven member, a gear pivotally connected to the driven member, a tapered member connected to the driving member and provided with spirally arranged grooves therein, means engageable in the grooves for shifting the driving member to bring the different gears thereof into mesh with the gear of the driven member, the toothed bridges engaging the gear of the driven member during the shifting movement of the driving member, means engageable with the tapered member for swinging the gear of the driven member during the shifting of the driving member, means for throwing the gear of the driven member out of mesh with the gears of the driving member, and means for shifting the driving member at the time that the gears thereof are out of mesh with the gear of the driven member.

16. A device of the character described comprising a driving member having longitudinally spaced gears thereon, a driven member, a gear carried by the driven member, a member connected to the driving member and provided with spirally arranged grooves, and a lever having a roller adapted to be received in the grooves of said member connected to the driving member whereby the driving member will be shifted, by the rotation thereof, to bring the different gears thereof into mesh with the gear of the driven member.

17. A device of the character described comprising a drive shaft, a shaft to be driven coaxially with said drive shaft, an internal gear, a universal joint between said internal gear and one of the shafts, a plurality of gears of different sizes rotatable with the other shaft and movable bodily into alignment with the internal gear, spiral bridge gears connecting the gears of different diameters, and means for effecting relative pivotal and bodily shift of said gears to bring the internal gear into engagement with the gears of different diameters, the internal gear meshing with the spiral bridge gears during the shifting of the gears.

18. A device of the character described comprising a drive shaft, a shaft to be driven coaxially with the drive shaft, an internal gear, a universal joint between and connecting said internal gear and one of said shafts, a plurality of gears of different sizes rotatable with the other shaft and bodily movable thereon, spiral bridge gears connecting the gears of different sizes, and means for pivotally shifting the internal gear and bodily shifting the other gears to bring the internal gear into and out of engagement with the other gears, the internal gear meshing with the spiral bridge gears during the shifting of the gears.

19. A device of the character described comprising a drive shaft, a shaft to be driven coaxially with the drive shaft, an internal gear, a universal joint between and connecting said internal gear and one of said shafts, means for retaining said internal gear in a position so that its axis of rotation will be in a plane vertical to the axis of said shafts, a plurality of gears of different sizes rotatable with the other shaft and movable bodily into alignment with the internal gear, spiral bridge gears connecting the gears of different sizes, and means for effecting relative pivotal and bodily shift of said gears to bring the internal gear into engagement with the gears of different sizes, the internal gear meshing with the spiral bridge gears during the shifting of the gears.

In testimony whereof I hereunto affix my signature in the presence of two witnesses.

AUSTIN P. KNILL.

Witnesses:
FRANK D. DE LASHMUTT,
J. P. CAMPBELL.